US012614513B2

(12) United States Patent
Park et al.

(10) Patent No.: US 12,614,513 B2
(45) Date of Patent: Apr. 28, 2026

(54) DRIVING CONTROLLER, DISPLAY DEVICE, AND METHOD OF DRIVING THE SAME

(71) Applicant: Samsung Display Co., LTD., Yongin-si (KR)

(72) Inventors: Se Hyuk Park, Yongin-si (KR); Young Ha Sohn, Yongin-si (KR); Jin Wook Yang, Yongin-si (KR); Dong Gyu Lee, Yongin-si (KR); Suk Hun Lee, Yongin-si (KR); Jae Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 93 days.

(21) Appl. No.: 18/388,830

(22) Filed: Nov. 11, 2023

(65) Prior Publication Data

US 2024/0347001 A1 Oct. 17, 2024

(30) Foreign Application Priority Data

Apr. 13, 2023 (KR) ........................ 10-2023-0048837

(51) Int. Cl.
*G09G 3/3233* (2016.01)

(52) U.S. Cl.
CPC ... *G09G 3/3233* (2013.01); *G09G 2320/0242* (2013.01); *G09G 2320/0285* (2013.01)

(58) Field of Classification Search
CPC ....... G09G 2310/08; G09G 2310/0243; G09G 2310/0251; G09G 2310/0216; G09G 2310/067; G09G 2310/0264; G09G 2340/0435; G09G 2320/0247; G09G 2320/0233; G09G 2320/0252; G09G 3/3233; G09G 3/3266; G09G 3/3283; G09G 3/2092; G09G 3/3208; G09G 2300/0819; G09G 2300/0842; G09G 2300/0426; G09G 2300/0809
See application file for complete search history.

(56) References Cited

U.S. PATENT DOCUMENTS

| | | | |
|---|---|---|---|
| 9,911,374 | B2 | 3/2018 | Park et al. |
| 11,158,261 | B2 | 10/2021 | Kim et al. |
| 11,605,353 | B2 | 3/2023 | Sang et al. |

(Continued)

FOREIGN PATENT DOCUMENTS

| | | | |
|---|---|---|---|
| KR | 1020210019639 | A | 2/2021 |
| KR | 102332426 | B1 | 12/2021 |

(Continued)

*Primary Examiner* — Dong Hui Liang
(74) *Attorney, Agent, or Firm* — CANTOR COLBURN LLP

(57) ABSTRACT

A display device includes an on-duty determiner which determines an on-duty period of an emission signal, based on a number of at least one cycle of a current frame, a first compensation value determiner which determines a first compensation value of a bias voltage according to a variation of the on-duty period, a second compensation value determiner which determines a second compensation value of the bias voltage, based on a driving frequency of a previous frame, and a third compensation value determiner which determines a third compensation value, based on the first compensation value and the second compensation value.

17 Claims, 15 Drawing Sheets

(56) References Cited

U.S. PATENT DOCUMENTS

| | | | | |
|---|---|---|---|---|
| 2013/0135282 | A1* | 5/2013 | Jeon | G09G 3/3696 345/212 |
| 2020/0226980 | A1* | 7/2020 | Park | G09G 3/3233 |
| 2022/0108656 | A1* | 4/2022 | Lee | G09G 3/3275 |
| 2023/0088459 | A1 | 3/2023 | Chung et al. | |
| 2023/0386390 | A1* | 11/2023 | Park | G09G 3/3233 |

FOREIGN PATENT DOCUMENTS

| | | | |
|---|---|---|---|
| KR | 1020220022406 | A | 2/2022 |
| KR | 1020220041509 | A | 4/2022 |

* cited by examiner

FIG. 4

| CY | DC(H) |
|---|---|
| 1 | 0 |
| 2 | 0 |
| 3 | 0 |
| 4 | 0 |
| 5 | 2 |
| 6 | 2 |
| 7 | 4 |
| 8 | 4 |
| 9 | 6 |
| 10 | 6 |
| 11 | 8 |
| 12 | 8 |
| 13 | 10 |
| 14 | 10 |
| 15 | 12 |
| 16 | 12 |

FIG. 7

| CV2(V) | | | | | | |
|---|---|---|---|---|---|---|
| PFC(Hz) | | 240 | 160 | ··· | 40 | 30 |
| CY | 1 | 6.00 | 6.00 | ··· | 6.00 | 6.00 |
| | 2 | 6.00 | 6.00 | ··· | 6.00 | 6.00 |
| | ⋮ | ⋮ | ⋮ | ··· | ⋮ | ⋮ |
| | 7 | 6.65 | 6.45 | ··· | 6.05 | 6.00 |
| | 8 | 6.65 | 6.45 | ··· | 6.05 | 6.00 |
| | ⋮ | ⋮ | ⋮ | ··· | ⋮ | ⋮ |
| | 15 | 6.85 | 6.60 | ··· | 6.10 | 6.00 |
| | 16 | 6.85 | 6.60 | ··· | 6.10 | 6.00 |

MC2

FIG. 8

| DC(H) | CV1(V) |
|---|---|
| 0 | 0.00 |
| 1 | 0.05 |
| 2 | 0.10 |
| 3 | 0.15 |
| 4 | 0.20 |
| 5 | 0.25 |
| 6 | 0.30 |
| 7 | 0.35 |
| 8 | 0.40 |
| 9 | 0.45 |
| 10 | 0.50 |
| 11 | 0.55 |
| 12 | 0.60 |
| 13 | 0.65 |
| 14 | 0.70 |
| 15 | 0.75 |

FIG. 9

| CY | DC(H) | CV1(V) |
|---|---|---|
| 1 | 0 | 0.00 |
| 2 | 0 | 0.00 |
| 3 | 0 | 0.00 |
| 4 | 0 | 0.00 |
| 5 | 0 | 0.00 |
| 6 | 0 | 0.00 |
| 7 | 4 | 0.20 |
| 8 | 4 | 0.20 |
| 9 | 6 | 0.30 |
| 10 | 6 | 0.30 |
| 11 | 8 | 0.40 |
| 12 | 8 | 0.40 |
| 13 | 10 | 0.50 |
| 14 | 10 | 0.50 |
| 15 | 12 | 0.60 |
| 16 | 12 | 0.60 |

MC1

| CV3(V) | | | | | | |
|---|---|---|---|---|---|---|
| PFC(Hz) | | 240 | 160 | ··· | 40 | 30 |
| CY | 1 | 6.00 | 6.00 | ··· | 6.00 | 6.00 |
| | 2 | 6.00 | 6.00 | ··· | 6.00 | 6.00 |
| | ⋮ | ⋮ | ⋮ | ··· | ⋮ | ⋮ |
| | 7 | 6.65 | 6.45 | ··· | 6.05 | 6.00 |
| | 8 | 6.65 | 6.45 | ··· | 6.05 | 6.00 |
| | ⋮ | ⋮ | ⋮ | ··· | ⋮ | ⋮ |
| | 15 | 6.85 | 6.60 | ··· | 6.10 | 6.00 |
| | 16 | 6.85 | 6.60 | ··· | 6.10 | 6.00 |

MC1 + MC2 ≥ MV

| CV3(V) | | | | | | |
|---|---|---|---|---|---|---|
| PFC(Hz) | | 240 | 160 | ··· | 40 | 30 |
| CY | 1 | 6.00 | 6.00 | ··· | 6.00 | 6.00 |
| | 2 | 6.00 | 6.00 | ··· | 6.00 | 6.00 |
| | ⋮ | ⋮ | ⋮ | ··· | ⋮ | ⋮ |
| | 7 | 6.85 | 6.65 | ··· | 6.25 | 6.20 |
| | 8 | 6.85 | 6.65 | ··· | 6.25 | 6.20 |
| | ⋮ | ⋮ | ⋮ | ··· | ⋮ | ⋮ |
| | 15 | 7.45 | 7.20 | ··· | 6.70 | 6.60 |
| | 16 | 7.45 | 7.20 | ··· | 6.70 | 6.60 |

FIG. 16

| CV3(V) | | | | | | |
|---|---|---|---|---|---|---|
| PFC(Hz) | | 240 | 160 | ··· | 40 | 30 |
| CY | 1 | 6.00 | 6.00 | ··· | 6.00 | 6.00 |
| | 2 | 6.00 | 6.00 | ··· | 6.00 | 6.00 |
| | ⋮ | ⋮ | ⋮ | ··· | ⋮ | ⋮ |
| | 7 | 6.75 | 6.55 | ··· | 6.15 | 6.10 |
| | 8 | 6.75 | 6.55 | ··· | 6.15 | 6.10 |
| | ⋮ | ⋮ | ⋮ | ··· | ⋮ | ⋮ |
| | 15 | 7.15 | 6.90 | ··· | 6.40 | 6.30 |
| | 16 | 7.15 | 6.90 | ··· | 6.40 | 6.30 |

MC1 + MC2 ≥ MV
(0.60) (6.85) (7.20)

DRIVING CONTROLLER, DISPLAY DEVICE, AND METHOD OF DRIVING THE SAME

The application claims priority to Korean patent application No. 10-2023-0048837, filed on Apr. 13, 2023, and all the benefits accruing therefrom under 35 U.S.C. § 119, the content of which in its entirety is herein incorporated by reference.

BACKGROUND

1. Field

The disclosure generally relates to a driving controller, a display device, and a method of driving the same, and more particularly, to a driving controller for supporting a variable frame mode, a display device, and a method of driving the same.

2. Description of the Related Art

A display device displays an image at a constant driving frequency of 60 hertz (Hz) or more. However, a rendering frequency of rendering caused by a main processor (e.g., a graphic processing unit ("GPU") or the like) which provides input image data to the display device may not accord with the driving frequency of the display device, and a tearing phenomenon in which a boundary line is generated in in an image displayed in the display device may occur due to frequency discordance.

In order to prevent the tearing phenomenon, a variable frame mode, in which the rendering frequency of the main processor and the driving frequency of the display device are synchronized with each other, is being developed.

SUMMARY

However, in the display device operated in the variable frame mode, there may occur a luminance decrease at relatively low frequency due to a leakage characteristic of a transistor included in each of sub-pixels and/or a luminance increase according to a change in driving frequency due to a hysteresis characteristic of the transistor included in each of the sub-pixels.

Embodiments provide a driving controller for controlling a bias voltage.

Embodiments also provide a display device including the driving controller.

Embodiments also provide a method of driving the display device.

In an embodiment of the disclosure, there is provided a driving controller including: an on-duty determiner which determines an on-duty period of an emission signal, based on a number of at least one cycle of a current frame; a first compensation value determiner which determines a first compensation value of a bias voltage according to a variation of the on-duty period; a second compensation value determiner which determines a second compensation value of the bias voltage, based on a driving frequency of a previous frame; and a third compensation value determiner which determines a third compensation value, based on the first compensation value and the second compensation value.

In an embodiment, the on-duty period may become larger as the number of the at least one cycle becomes larger.

In an embodiment, the on-duty determiner may determine the on-duty period by a first lookup table including the variation of the on-duty period according to the number of the at least one cycle.

In an embodiment, the first compensation value may become larger as the variation of the on-duty period becomes larger.

In an embodiment, the first compensation value determiner may determine the first compensation value by a second lookup table including the first compensation value according to the variation of the on-duty period.

In an embodiment, the second compensation value may become larger as the driving frequency of the previous frame becomes higher.

In an embodiment, the second compensation value may become larger as a difference between the driving frequency of the previous frame and a driving frequency of the current frame becomes larger.

In an embodiment, the second compensation value determiner may determine the second compensation value by a third lookup table including the second compensation value according to the driving frequency of the previous frame and the number of the at least one cycle.

In an embodiment, the driving controller may further include a comparator which compares a sum of a maximum value of the first compensation value and a maximum value of the second compensation value with a maximum output voltage of a power supply, thereby outputting a comparison result. The third compensation value determiner may determine the third compensation value, based on the comparison result.

In an embodiment, when the sum of the maximum value of the first compensation value and the maximum value of the second compensation value is greater than or equal to the maximum output voltage of the power supply, the third compensation value determiner may determine the second compensation value as the third compensation value.

In an embodiment, the on-duty determiner may not change the on-duty period when the sum of the maximum value of the first compensation value and the maximum value of the second compensation value is greater than or equal to the maximum output voltage of the power supply and when a difference between the driving frequency of the previous frame and a driving frequency of the current frame is higher than a reference frequency, and change the on-duty period when the sum of the maximum value of the first compensation value and the maximum value of the second compensation value is smaller than the maximum output voltage of the power supply and when the difference between the driving frequency of the previous frame and the driving frequency of the current frame is higher than the reference frequency.

In an embodiment, when the sum of the maximum value of the first compensation value and the maximum value of the second compensation value is greater than or equal to the maximum output voltage of the power supply, the third compensation value determiner may determine, as the third compensation value, a sum of a product of the first compensation value and a first factor and a product of the second compensation value and a second factor. A sum of a product of the maximum value of the first compensation value and the first factor and a product of the maximum value of the second compensation value and the second factor may be smaller than the maximum output voltage of the power supply.

In an embodiment, when the sum of the maximum value of the first compensation value and the maximum value of the second compensation value is smaller than the maximum output voltage of the power supply, the third compensation value determiner may determine, as the third compensation value, a sum of the first compensation value and the second compensation value.

In an embodiment, when the sum of the maximum value of the first compensation value and the maximum value of the second compensation value is smaller than the maximum output voltage of the power supply, the third compensation value determiner may determine, as the third compensation value, a sum of a product of the first compensation value and a first factor and a product of the second compensation value and a second factor.

In an embodiment, the bias voltage may be determined as the third compensation value.

In an embodiment, the second compensation value determiner may determine the second compensation value by a third lookup table including the second compensation value according to the driving frequency of the previous frame and the number of the at least one cycle. The second compensation value included in the third lookup table may be updated to the third compensation value.

In another embodiment of the disclosure, there is provided a display device including: a display panel including sub-pixels; a data driver which provides data voltages to the sub-pixels; a gate driver which provides gate signals to the sub-pixels; an emission driver which provides emission signals to the sub-pixels; and a driving controller which controls the data driver and the gate driver, where the driving controller determines an on-duty period of an emission signal of the emission signals, based on a number of at least one cycle of a current frame, determines a first compensation value of a bias voltage according to a variation of the on-duty period, determines a second compensation value of the bias voltage, based on a driving frequency of a previous frame, and determines a third compensation value, based on the first compensation value and the second compensation value.

In still another embodiment of the disclosure, there is provided a method of driving a display device, the method including: determining an on-duty period of an emission signal, based on a number of at least one cycle of each frame; determining a first compensation value of a bias voltage according to a variation of the on-duty period; determining a second compensation value of the bias voltage, based on a driving frequency of a previous frame; and determining a third compensation value, based on the first compensation value and the second compensation value.

In an embodiment, the method may further include comparing a sum of a maximum value of the first compensation value and a maximum value of the second compensation value with a maximum output voltage of a power supply. The third compensation value may be determined based on a result obtained by comparing the sum of the maximum value of the first compensation value and the maximum value of the second compensation value with the maximum output voltage of the power supply.

In an embodiment, the third compensation value may be determined as the second compensation value when the sum of the maximum value of the first compensation value and the maximum value of the second compensation value is greater than or equal to the maximum output voltage of the power supply, and be determined as a sum of the first compensation value and the second compensation value when the sum of the maximum value of the first compensation value and the maximum value of the second compensation value is smaller than the maximum output voltage of the power supply.

BRIEF DESCRIPTION OF THE DRAWINGS

Embodiments will now be described more fully hereinafter with reference to the accompanying drawings.

FIG. 4 is a table illustrating an embodiment of a first lookup table of the display device shown in FIG. 1.

FIG. 7 is a table illustrating an embodiment of a third lookup table of the display device shown in FIG. 1.

FIG. 8 is a table illustrating an embodiment of a second lookup table of the display device shown in FIG. 1.

FIG. 9 is a table obtained by combining the first lookup table shown in FIG. 4 and the second lookup table shown in FIG. 8.

FIG. 16 is a diagram illustrating an embodiment of an operation of the display device shown in FIG. 15 when the sum of the maximum value of the first compensation value and the maximum value of the second compensation value is greater than or equal to the maximum output voltage of the power supply.

DETAILED DESCRIPTION

Figure 1:
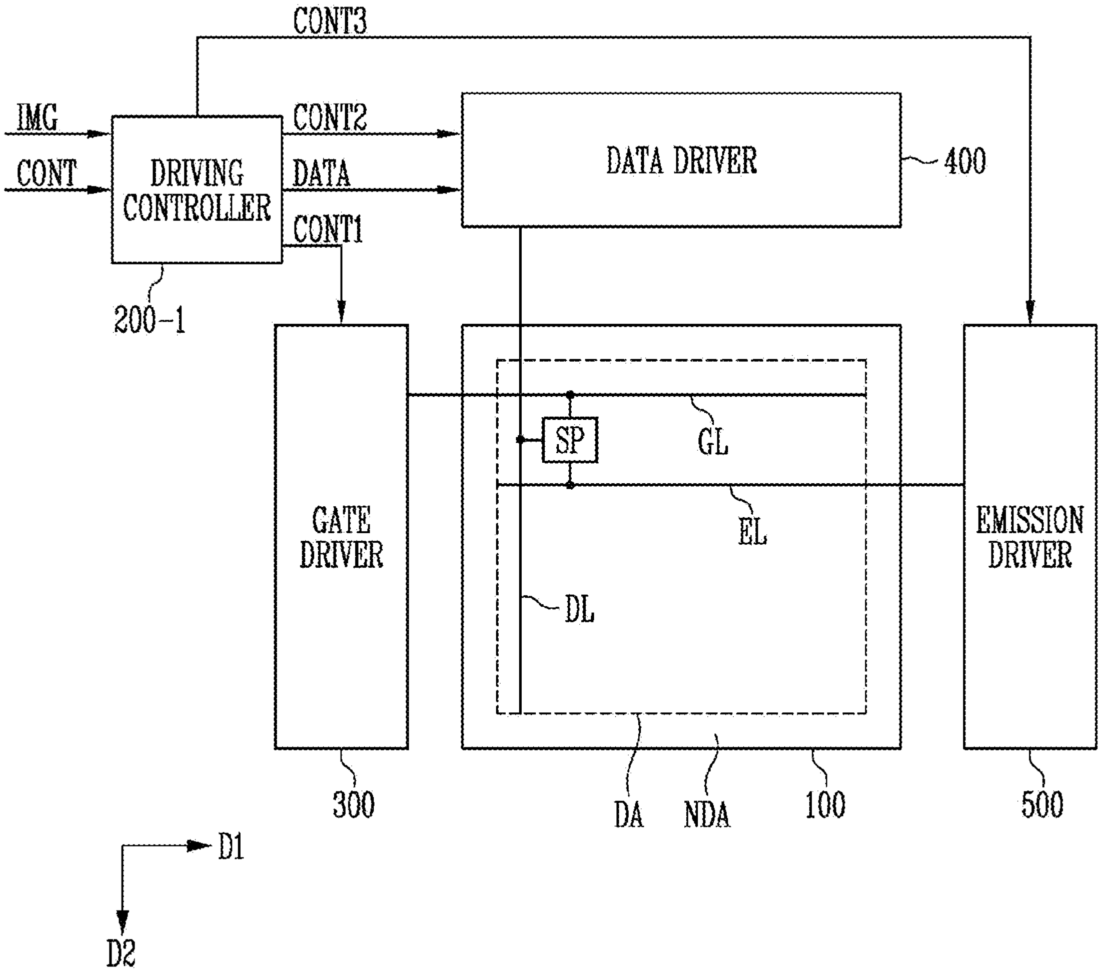
FIG. 1 is a block diagram illustrating an embodiment of a display device in accordance with the disclosure.

Hereinafter, embodiments of the disclosure will be described in more detail with reference to the accompanying drawings. In the description below, only a desired part to understand an operation according to the disclosure is described and the descriptions of other parts are omitted in order not to unnecessarily obscure subject matters of the disclosure. In addition, the disclosure is not limited to embodiments described herein, but may be embodied in various different forms. Rather, embodiments described herein are provided to thoroughly and completely describe the disclosed contents and to sufficiently transfer the ideas of the disclosure to a person of ordinary skill in the art.

In the entire specification, when an element is referred to as being "connected" or "coupled" to another element, it may be directly connected or coupled to the another element or be indirectly connected or coupled to the another element with one or more intervening elements interposed therebetween. The technical terms used herein are used only for the purpose of illustrating an illustrative embodiment and not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" may be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" may be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are only used to distinguish one element from another element. Thus, a "first" element discussed below could also be termed a "second" element without departing from the teachings of the present disclosure.

Spatially relative terms, such as "below," "above," and the like, may be used herein for ease of description to describe the relationship of one element to another element, as illustrated in the drawing figures. It will be understood that the spatially relative terms, as well as the illustrated configurations, are intended to encompass different orientations of the apparatus in use or operation in addition to the orientations described herein and depicted in the drawing figures. For example, if the apparatus in the drawing figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

In addition, the embodiments of the disclosure are described here with reference to schematic diagrams of ideal embodiments (and an intermediate structure) of the disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the disclosure.

FIG. 1 is a block diagram illustrating an embodiment of a display device in accordance with the disclosure.

Referring to FIG. 1, the display device may include a display panel 100, a driving controller 200-1, a gate driver 300, a data driver 400, and an emission driver 500. In an embodiment, the driving controller 200-1 and the data driver 400 may be integrated into one chip.

The display panel 100 may include a display area DA in which an image is displayed and a non-display area NDA disposed adjacent to the display area DA. In an embodiment, the gate driver 300 and the emission driver 500 may be disposed (e.g., mounted) in the non-display area NDA.

The display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the emission lines EL may extend in a first direction D1, and the data lines DL may extend in a second direction D2 intersecting the first direction D1.

The driving controller 200-1 may receive input image data IMG and an input control signal CONT from a host processor (e.g., a graphic processing unit ("GPU") or the like). In an embodiment, the input image data IMG may include red image data, green image data, and blue image data. In an embodiment, the input image data IMG may further include white image data. In another embodiment, the input image data IMG may include magenta image data, yellow image data, and cyan image data. The input image data CONT may include a master clock signal and a data enable signal. The input control signal CONT may further include a vertical synchronization signal and a horizontal synchronization signal.

The driving controller 200-1 may generate a first control signal CONT1, a second control signal CONT2, a third control signal CONT3, and a data signal DATA, based on the input image data IMG and the input control signal CONT.

The driving controller 200-1 may generate the first control signal CONT1 for controlling an operation of the gate driver 300, based on the input control signal CONT, and output the first control signal CONT1 to the gate driver 300. The first control signal CONT1 may include a vertical start signal and a gate clock signal.

The driving controller 200-1 may generate the second control signal CONT2 for controlling an operation of the data driver 400, based on the input control signal CONT, and output the second control signal CONT2 to the data driver 400. The second control signal CONT2 may include a horizontal start signal and a load signal.

The driving controller 200-1 may generate the data signal DATA by receiving the input image data IMG and the input control signal CONT. The driving controller 200-1 may output the data signal DATA to the data driver 400.

The driving controller 200-1 may generate the third control signal CONT3 for controlling an operation of the emission driver 500, based on the input control signal CONT, and output the third control signal CONT3 to the emission driver 500. The third control signal CONT3 may include a vertical start signal and an emission clock signal.

The gate driver 300 may generate gate signals for driving the gate lines GL in response to the first control signal CONT1 input from the driving controller 200-1. The gate driver 300 may output the gate signals to the gate lines GL. In an embodiment, the gate driver 300 may sequentially output the gate signals to the gate lines GL, for example.

The data driver 400 may receive the second control signal CONT2 and the data signal DATA, which are input from the driving controller 200-1. The data driver 400 may generate data voltages obtained by converting the data signal DATA into a voltage in an analog form. The data driver 400 may output the data voltages to the data lines DL.

The emission driver 500 may generate emission signals for driving the emission lines EL in response to the third control signal CONT3 input from the driving controller 200-1. The emission driver 500 may output the emission signals to the emission lines EL. In an embodiment, the emission driver 500 may sequentially output the emission signals to the emission lines EL, for example.

Figure 2:
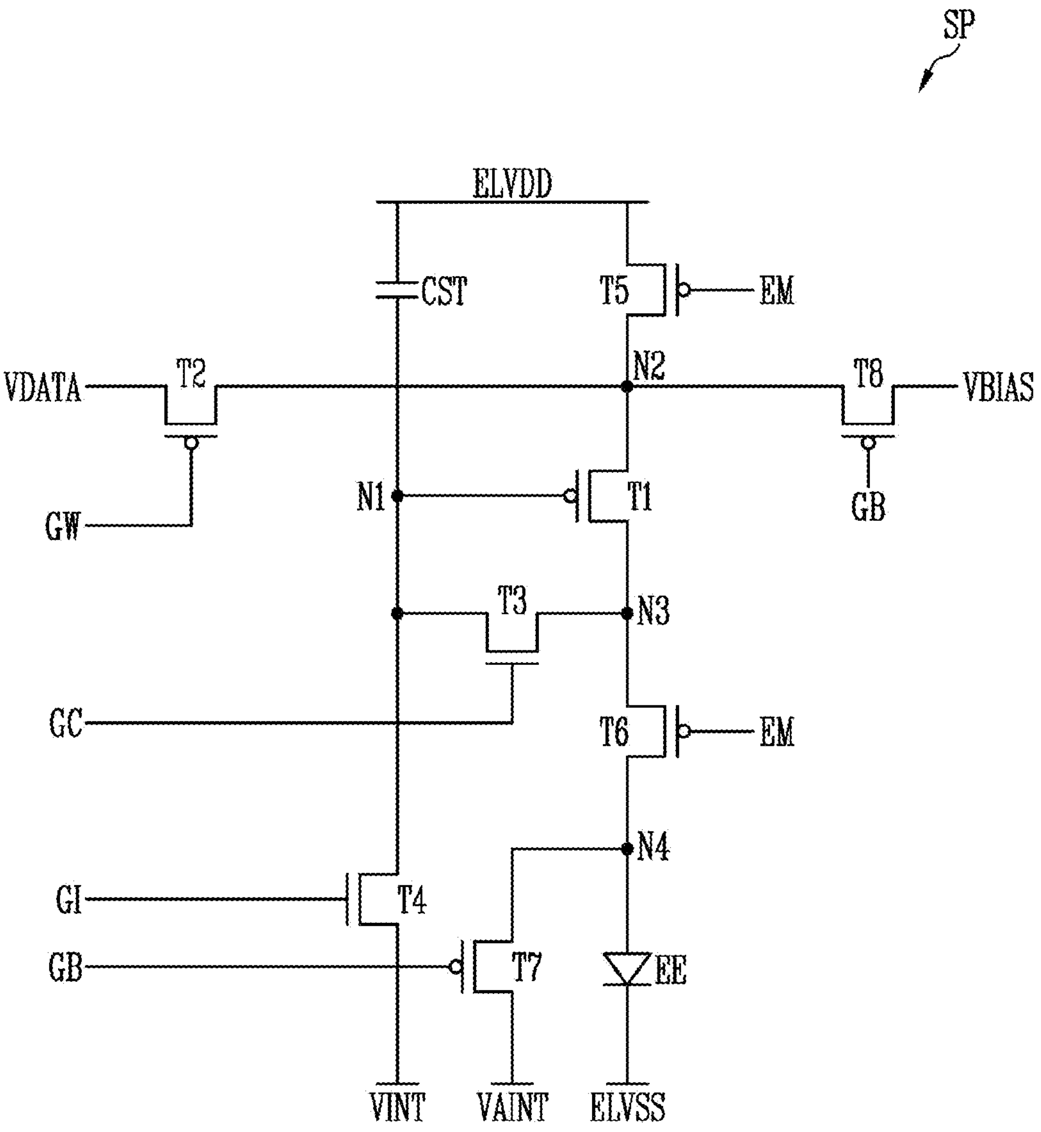
FIG. 2 is a circuit diagram illustrating an embodiment of a sub-pixel of the display device shown in FIG. 1.

FIG. 2 is a circuit diagram illustrating an embodiment of the sub-pixel SP of the display device shown in FIG. 1.

Referring to FIG. 2, each sub-pixel SP may include: a first transistor T1 (i.e., a driving transistor) including a control electrode connected to a first node N1, a first electrode connected to a second node N2, and a second electrode connected to a third node N3; a second transistor T2 including a control electrode receiving a write gate signal GW, a first electrode receiving a data voltage VDATA, and a second electrode connected to the second node N2; a third transistor T3 including a control electrode receiving a compensation gate signal GC, a first electrode connected to the third node N3, and a second electrode connected to the first node N1; a fourth transistor T4 including a control electrode receiving an initialization gate signal GI, a first electrode receiving a first initialization voltage VINT, and a second electrode connected to the first node N1; a fifth transistor T5 including a control electrode receiving an emission signal EM, a first electrode receiving a first power voltage ELVDD (e.g., a relatively high power voltage), and a second electrode connected to the second node N2; a sixth transistor T6 including a control electrode receiving the emission signal EM, a first electrode connected to the third node N3, and a second electrode connected to a fourth node N4; a seventh transistor T7 including a control electrode receiving a bias gate signal GB, a first electrode receiving a second initialization voltage VAINT, and a second electrode connected to the fourth node N4; an eighth transistor T8 including a control electrode receiving the bias gate signal GB, a first electrode receiving a bias voltage VBIAS, and a second electrode connected to the second node N2; a storage capacitor CST including a first electrode receiving the first power voltage ELVDD and a second electrode connected to the first node N1; and a light-emitting element EE including a first electrode (i.e., an anode electrode) connected to the fourth node N4 and a second electrode receiving a second power voltage ELVSS (e.g., a relatively low power voltage).

However, the disclosure is not limited to the structure of the sub-pixel SP, and any sub-pixel structure is possible, in which the bias voltage VBIAS for initializing a hysteresis characteristic of the first transistor T1 is applied to the first transistor T1.

The first, second, and fifth to eighth transistors T1, T2, T5, T6, T7, and T8 may be implemented with a p-channel metal oxide semiconductor ("PMOS") transistor. A relatively low voltage level may be an activation level, and a relatively high voltage level may be an inactivation level. In an embodiment, when a signal applied to a control electrode of the PMOS transistor has the relatively low voltage level, the PMOS transistor may be turned on. In an embodiment, when a signal applied to the control electrode of the PMOS transistor has the relatively high voltage level, the PMOS transistor may be turned off.

The third and fourth transistors T3 and T4 may be implemented with an n-channel metal oxide semiconductor ("NMOS") transistor. A relatively low voltage level may be the inactivation level, and a relatively high voltage level may be the activation level. In an embodiment, when a signal applied to a control electrode of the NMOS transistor has the relatively low voltage level, the NMOS transistor may be turned off. In an embodiment, when a signal applied to the control electrode of the NMOS transistor has the relatively high voltage level, the NMOS transistor may be turned on. That is, the activation level and the inactivation level may be determined according to a kind of transistor.

However, the disclosure is not limited thereto. In an embodiment, the first, second, and fifth to eighth transistors T1, T2, T5, T6, T7, and T8 may be implemented with an NMOS transistor, for example. In an embodiment, the third and fourth transistors T3 and T4 may be implemented with a PMOS transistor, for example.

In an embodiment, in a first initialization period, the initialization gate signal GI may have the activation level, and the fourth transistor T4 may be turned on, for example. Accordingly, the first initialization voltage VINT may be applied to the first node N1 (i.e., a gate initialization operation). That is, the control electrode of the first transistor T1 (i.e., the storage capacitor CST) may be initialized.

In an embodiment, in a data writing period, the write gate signal GW and the compensation gate signal GC may have the activation level, and the second transistor T2 and the third transistor T3 may be turned on, for example. Accordingly, the data voltage VDATA may be written into the storage capacitor CST.

In an embodiment, in a second initialization period, the bias gate signal GB may have the activation level, and the seventh transistor T7 and the eighth transistor T8 may be turned on, for example. Accordingly, the second initialization voltage VAINT may be applied to the first electrode (i.e., the anode electrode) of the light-emitting element EE, and the bias voltage VBIAS may be applied to the first electrode of the first transistor T1. That is, the anode electrode of the light-emitting element EE may be initialized, and the hysteresis characteristic of the first transistor T1 may be initialized.

In an embodiment, in a light emission period, the emission signal EM may have the activation level, and the fifth transistor T5 and the sixth transistor T6 may be turned on, for example. Accordingly, the first power voltage ELVDD may be applied to the first transistor T1, so that a driving current is generated, and the driving current may be applied to the light-emitting element EE. That is, the light-emitting element EE may emit light with a luminance corresponding to the driving current.

Figure 3:
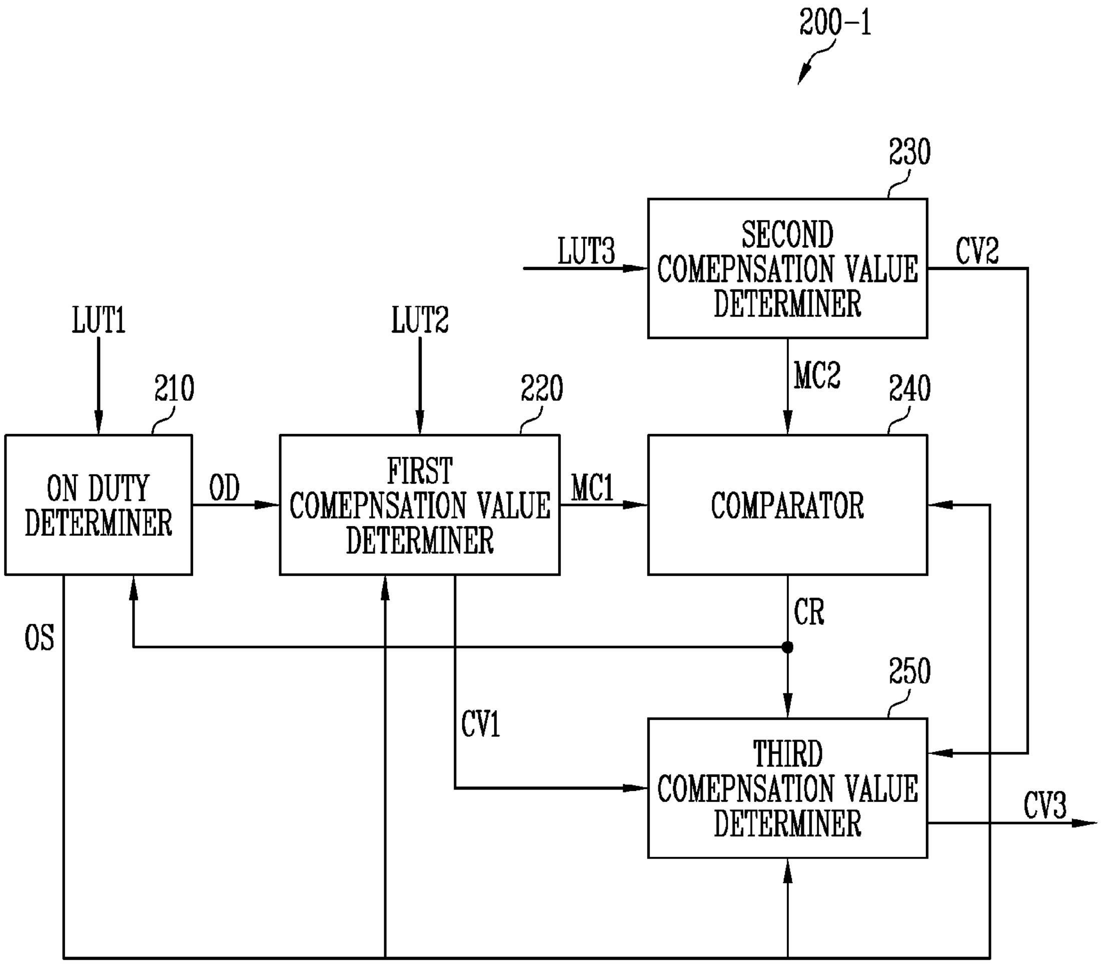
FIG. 3 is a block diagram illustrating an embodiment of a driving controller of the display device shown in FIG. 1.

FIG. 3 is a block diagram illustrating an embodiment of the driving controller 200-1 of the display device shown in FIG. 1.

Referring to FIGS. 1 to 3, the driving controller 200-1 may include an on-duty determiner 210, a first compensation value determiner 220, a second compensation value determiner 230, a comparator 240, and a third compensation value determiner 250.

The on-duty determiner 210 may determine an on-duty period OD of the emission signal EM. The on-duty determiner 210 may provide the on-duty period OD to the first compensation value determiner 220.

The first compensation value determiner 220 may determine a first compensation value CV1, based on the on-duty period OD. The first compensation value determiner 220 may provide the first compensation value CV1 to the third compensation value determiner 250, and provide a maximum value MC1 of the first compensation value CV1 to the comparator 240.

The second compensation value determiner 230 may determine a second compensation value CV2, based on a driving frequency of a previous frame. The second compensation value determiner 230 may provide the second compensation value CV2 to the third compensation value determiner 250, and provide a maximum value MC2 of the second compensation value CV2 to the comparator 240.

The comparator 240 may compare a sum of the maximum value MC1 of the first compensation value CV1 and the maximum value MC2 of the second compensation value CV2 with a maximum output voltage of a power supply, thereby outputting a comparison result CR. The comparator 240 may provide the comparison result CR to the on-duty determiner 210 and the third compensation value determiner 250.

The power supply may supply power desired for an operation of the display device. In an embodiment, the power supply may be a power management integrated circuit ("PMIC"), for example. In an embodiment, the maximum output voltage of the power supply may be a maximum voltage which the power supply may supply, for example.

The third compensation value determiner 250 may determine a third compensation value CV3, based on the first compensation value CV1, the second compensation value CV2, and the comparison result CR. The bias voltage VBIAS may be set to the third compensation value CV3.

The on-duty determiner 210 may receive the comparison result CR and determine whether the on-duty period OD is changed based on the comparison result CR. When the on-duty period OD is not changed, the on-duty determiner 210 may provide an off signal OS to the first compensation value determiner 220, the comparator 240, and the third compensation value determiner 250. This operation will be described in further detail later.

In various embodiments of the disclosure, the on-duty determiner 210, the first compensation value determiner 220, the second compensation value determiner 230, the comparator 240, and the third compensation value determiner 250 may be implemented in one form of hardware, software, firmware or a circuitry such as an application specific integrated circuit ("ASIC").

The on-duty determiner 210, the first compensation value determiner 220, the second compensation value determiner 230, the comparator 240, and the third compensation value determiner 250 will be described in detail later with reference to FIGS. 4 to 13.

Figure 5:
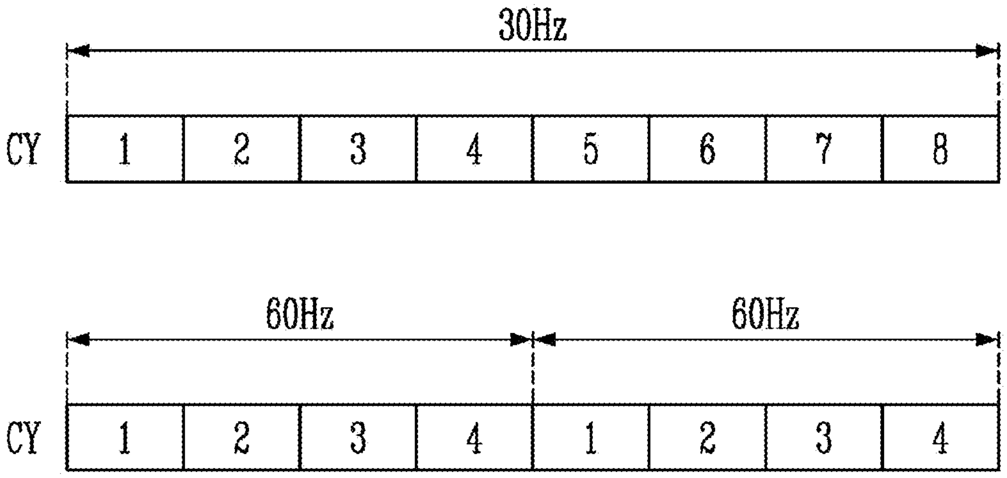
FIG. 5 is a diagram illustrating an embodiment in which the display device shown in FIG. 1 is operated in a variable frame mode.
Figure 6:
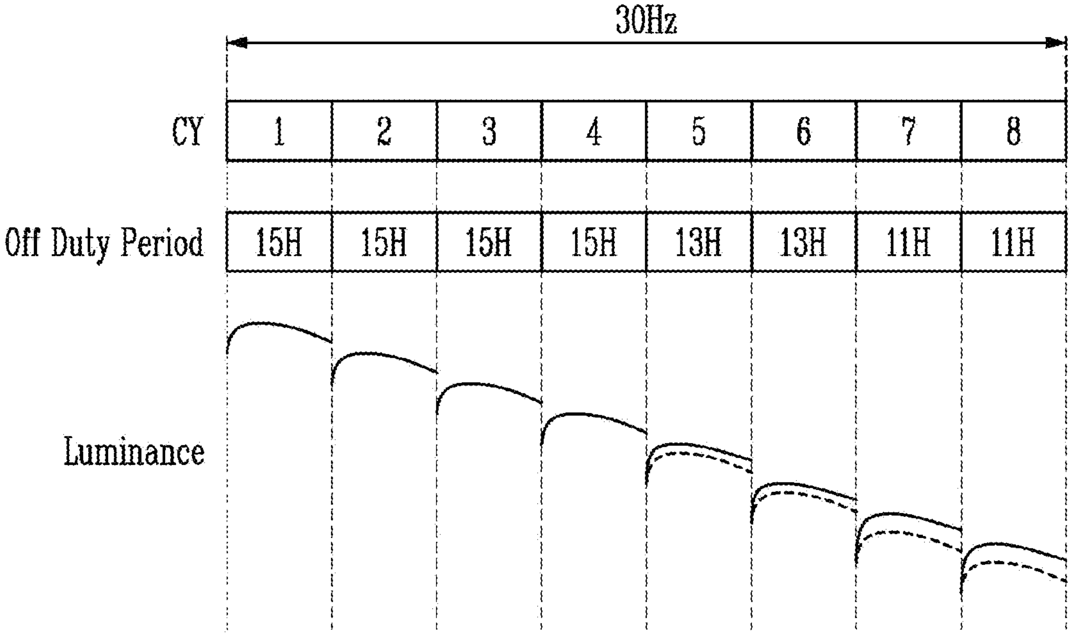
FIG. 6 is a diagram illustrating an embodiment in which the display device shown in FIG. 1 determines an on-duty period.

FIG. 4 is a table illustrating an embodiment of a first lookup table LUT1 of the display device shown in FIG. 1. FIG. 5 is a diagram illustrating an embodiment in which the display device shown in FIG. 1 is operated in a variable frame mode. FIG. 6 is a diagram illustrating an embodiment in which the display device shown in FIG. 1 determines an on-duty period OD.

FIGS. 4 and 6 represent variation DC of on-duty period OD and unit of off-duty period with horizontal time H. In an embodiment, one cycle CY may be configured with a plurality of horizontal times H, for example. However, the disclosure is not limited thereto.

Referring to FIGS. 1 to 6, the on-duty determiner 210 may determine an on-duty period OD of the emission signal EM, based on a number of at least one cycle CY of a current frame. In an embodiment, the on-duty determiner 210 may determine the on-duty period OD by a first lookup table LUT1 including a variation DC of the on-duty period OD according to the number of at least one cycle CY.

A driving frequency of the display device may be determined according to a number of at least one cycle CY included in one frame. In an embodiment, when the one frame includes one cycle CY, the driving frequency may be 240 Hz, for example. In an embodiment, when the one frame includes four cycles CY, the driving frequency may be 60 Hz, for example. In an embodiment, when the one frame includes eight cycles CY, the driving frequency may be 30 Hz, for example.

The display device may write a data voltage VDATA into the sub-pixels SP in a first cycle CY of each frame. The display device may allow the sub-pixels SP to emit light in the other cycle CY by the data voltage VDATA written in the first cycle CY of each frame.

In an embodiment, the first cycle CY of each frame may include a first initialization period, a data writing period, a second initialization period, and a light emission period, for example. In an embodiment, the other cycle CY except the first cycle CY of each frame may not include any data writing period, for example.

The on-duty period OD of the emission signal EM may be a period in which the emission signal EM in one cycle CY has the activation level. An off-duty period of the emission signal EM may be a period in which the emission signal EM in the one cycle CY has the inactivation level. The one cycle CY may have a constant length. That is, when the on-duty period OD is increased, the off-duty period may be decreased.

When the on-duty period OD of the emission signal EM is increased, a light emission period may be lengthened. In addition, as the light emission period is lengthened, a luminance in the one cycle CY may be increased.

In an embodiment, the on-duty period OD may become larger as the number of at least one cycle CY becomes larger. As shown in FIG. 6, the luminance may be decreased as the number of at least one cycle CY increases (e.g., as the driving frequency is lowered), due to a leakage characteristic of a transistor of the sub-pixel SP. The driving controller 200-1 may allow the on-duty period OD to become larger as the number of at least one cycle CY becomes larger so as to compensate for a luminance decrease due to the leakage characteristic.

In an embodiment, the variation DC of the on-duty period OD may be OH in first to fourth cycles CY, for example. In an embodiment, the variation DC of the on-duty period OD may be 2H in fifth and sixth cycles CY, for example. In an embodiment, the variation DC of the on-duty period OD may be 4H in seventh and eighth cycles CY, for example. In an embodiment, the variation DC of the on-duty period OD may be 6H in ninth and tenth cycles CY, for example. In an embodiment, the variation DC of the on-duty period OD may be 8H in eleventh and twelfth cycles CY, for example. In an embodiment, the variation DC of the on-duty period OD may be 10H in thirteenth and fourteenth cycles CY, for example. In an embodiment, the variation DC of the on-duty period OD may be 12H in fifteenth and sixteenth cycles CY, for example.

The variation DC of the on-duty period OD may be a difference between the on-duty period OD determined by the on-duty determiner 210 and a reference on-duty period. The reference on-duty period may be an on-duty period before the on-duty period OD is changed by the on-duty determiner 210.

In an embodiment, as shown in FIG. 6, it is assumed that the number of at least one cycle CY is 8 when the driving frequency is 30 Hz, and the off-duty period is 15H when the variation DC of the on-duty period OD is 0H. The variation DC of the on-duty period OD from the first cycle CY to the fourth cycle CY may be OH, and the off-duty period may be 15H. The variation DC of the on-duty period OD from the fifth cycle CY and the sixth cycle CY may be 2H, and the off-duty period may be 13H. A luminance decrement in the fifth cycle CY and the sixth cycle CY may be reduced as compared with a luminance decrement in the first to fourth cycles CY. The variation DC of the on-duty period OD from the seventh cycle CY to the eighth cycle CY may be 4H, and the off-duty period 11H. A luminance decrement in the seventh cycle CY and the eighth cycle CY may be reduced as compared with a luminance decrement in the first to sixth cycles CY.

In an embodiment, it is assumed that the number of at least one cycle CY is 4 when the driving frequency is 60 Hz, and the off-duty period is 15H when the variation DC of the on-duty period OD is 0H, for example. The variation DC of the on-duty period OD in all cycles CY may be OH, and the off-duty period may be 15H.

FIG. 7 is a table illustrating an embodiment of a third lookup table LUT3 of the display device shown in FIG. 1. For convenience of description, a second lookup table LUT2 will be described later.

In FIG. 7, a unit of the variation DC of the on-duty period is represented as horizontal time H, a unit of the first compensation value CV1 is represented as voltage V, and a unit of a representative frequency PFC is represented as hertz (Hz).

Referring to FIGS. 2, 3, and 7, the second compensation value determiner 230 may determine a second compensation value CV2 of the bias voltage VBIAS, based on a driving frequency of a previous frame. In an embodiment, the second compensation value determiner 230 may determine the second compensation value CV2 by a third lookup table LUT3 including the second compensation value CV2 corresponding to the driving frequency of the previous frame and a number of at least one cycle CY.

The third lookup table LUT3 may include the second compensation value CV2 according to a representative frequency PFC. In an embodiment, the representative frequency PFC may be the driving frequency of the previous frame.

In another embodiment, the representative frequency PFC may be a frequency calculated based on the driving frequency of the previous frame. In an embodiment, the representative frequency PFC may be an average of driving frequencies of N previous frames, for example. Here, N is a positive integer of 2 or more. In an embodiment, the representative frequency PFC may be a frequency calculated by applying weighted values to each of the driving frequencies of the N previous frames, for example. The weighted values may become larger as becoming closer to a current frame. However, the disclosure is not limited to the method of calculating the representative frequency PFC.

The bias voltage VBIAS may be applied to the first transistor T1 before each sub-pixel SP emits light. The sub-pixel SP may emit light with a luminance corresponding to a driving current generated by the first transistor T1. That is, the luminance may be influenced by the hysteresis characteristic of the first transistor T1. Also, the luminance may become smaller as the bias voltage VBIAS becomes higher.

When the driving frequency is changed from a relatively high frequency at which the luminance decrease due to the leakage characteristic is relatively small to a relatively low frequency at which the luminance decrease due to the leakage characteristic is large, the luminance may be increased due to the hysteresis characteristic. In addition, as the second compensation value CV2 becomes larger, the bias voltage VBIAS may become higher (this will be described in detail later). In order to compensate for a luminance increase due to the hysteresis characteristic, the second compensation value CV2 may become larger as the difference between the driving frequency of the previous frame and a driving frequency of the current frame becomes larger. Also, the second compensation value CV2 may become larger as the driving frequency of the previous frame becomes higher.

The representative frequency PFC may become higher as the driving frequency of the previous frame becomes higher. In addition, the number of at least one cycle CY may become larger as the driving frequency of the current frame becomes smaller. Therefore, the second compensation value CV2 may become larger as the representative frequency PFC becomes higher and the number of at least one cycle CY becomes larger.

In an embodiment, when the representative frequency PFC is 30 Hz, the second compensation value CV2 may be 6.00 volts (V) in the seventh cycle CY, for example. In an embodiment, when the representative frequency PFC is 40 Hz, the second compensation value CV2 may be 6.05V in the seventh cycle CY, for example.

For example, when the representative frequency PFC is 40 Hz, the second compensation value CV2 may be 6.00V in the first cycle CY. For example, when the representative frequency PFC is 40 Hz, the second compensation value CV2 may be 6.05V in the seventh cycle CY.

FIG. 8 is a table illustrating an embodiment of a second lookup table LUT2 of the display device shown in FIG. 1. FIG. 9 is a table obtained by combining the first lookup table LUT1 shown in FIG. 4 and the second lookup table LUT2 shown in FIG. 8.

In FIGS. 8 and 9, a unit of the variation DC of the on-duty period is represented as horizontal time H, and a unit of the first compensation value CV1 is represented as voltage V.

Referring to FIGS. 2 to 4, 8, and 9, the first compensation value determiner 220 may determine a first compensation value CV1 of the bias voltage VBIAS according to the variation DC of the on-duty period OD. In an embodiment, the first compensation value determiner 220 may determine the first compensation value CV1 by a second lookup table LUT2 including the first compensation value CV1 according to the variation DC of the on-duty period OD.

As described above, when the driving frequency is lowered from a relatively high frequency to a relatively low frequency, the luminance may be increased due to the hysteresis characteristic. In addition, when the driving frequency of the current frame is a relatively low frequency, the luminance may be increased due to an increase in the on-duty period OD. That is, when the driving frequency is lowered from the relatively high frequency to the relatively low frequency, the luminance may be influenced by not only the hysteresis characteristic but also the on-duty period OD. Therefore, the display device may determine the first compensation value CV1 for setting the bias voltage VBIAS by considering the on-duty period OD. A process of setting the bias voltage VBIAS, based on the first compensation value CV1 will be described in detail later.

The first compensation value CV1 may become larger as the variation DC of the on-duty period OD becomes larger. That is, the first compensation value CV1 may become larger as an on-duty period OD of the current frame becomes larger. In an embodiment, when the variation DC of the on-duty period OD is 0, the first compensation value CV1 may be 0.00, for example. In an embodiment, when the variation DC of the on-duty period OD is 1, the first compensation value CV1 may be 0.05, for example.

Figures 10, 11:
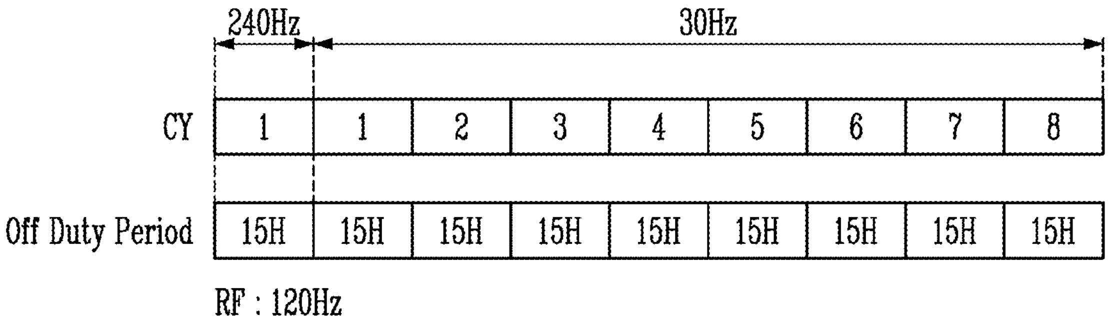
FIGS. 10 and 11 are diagrams illustrating an embodiment of an operation of the display device shown in FIG. 1 when a sum of a maximum value of a first compensation value and a maximum value of a second compensation value is greater than or equal to a maximum output voltage of a power supply.

FIGS. 10 and 11 are diagrams illustrating an embodiment of an operation of the display device shown in FIG. 1 when the sum of the maximum value MC1 of the first compensation value CV1 and the maximum value MC2 of the second compensation value CV2 is greater than or equal to the maximum output voltage MV of the power supply.

In FIG. 10, a unit of the variation DC of the on-duty period is represented as horizontal time H, a unit of the first compensation value CV1 is represented as voltage V, and a unit of a representative frequency PFC is represented as hertz (Hz).

Referring to FIGS. 2, 3, 7, and 9 to 11, the comparator 240 may compare the sum of the maximum value MC1 of the first compensation value CV1 and the maximum value MC2 of the second compensation value CV2 with the maximum output voltage MV of the power supply, thereby outputting a comparison result CR. The third compensation value determiner 250 may determine a third compensation value CV3, based on the comparison result CR, the first compensation value CV1, and the second compensation value CV2. The bias voltage VBIAS may be set to the third compensation value CV3.

The maximum value MC1 of the first compensation value CV1 may be a first compensation value CV1 corresponding to a maximum value of the variation DC of the on-duty period OD. In an embodiment, as shown in FIG. 4, the on-duty determiner 210 may change the on-duty period by a maximum of 12H, for example. In addition, as shown in FIG. 8, the first compensation value CV1 may be 0.60V when the variation DC of the on-duty period OD is 12H. That is, the maximum value MC1 of the first compensation value CV1 may be 0.60V.

The maximum value MC2 of the second compensation value CV2 may be a second compensation value CV2 when the representative frequency PFC is highest and the number of at least one cycle CY is largest. In an embodiment, as shown in FIG. 7, when the maximum value of the driving frequency is 240 Hz, the maximum value of the representative frequency PFC may be 240 Hz, for example. In addition, the largest number of at least one cycle CY may be 16. That is, the maximum value MC2 of the second compensation value CV2 may be 6.85V.

In an embodiment, when the sum of the maximum value MC1 of the first compensation value CV1 and the maximum value MC2 of the second compensation value CV2 is greater than or equal to the maximum output voltage MV of the power supply, the third compensation value determiner 250 may determine the second compensation value CV2 as the third compensation value CV3. When the sum of the maximum value MC1 of the first compensation value CV1 and the maximum value MC2 of the second compensation value CV2 is smaller than the maximum output voltage MV of the power supply, the third compensation value determiner 250 may determine, as the third compensation value CV3, a sum of the first compensation value CV1 and the second compensation value CV2. In an embodiment, as shown in FIGS. 7 and 10, the third compensation value CV3 may be equal to the second compensation value CV2, for example.

In another embodiment, when a sum of a product of the maximum value MC1 of the first compensation value CV1 and a first factor and a product of the maximum value MC2 of the second compensation value CV2 and a second factor is greater than or equal to the maximum output voltage MV of the power supply, the third compensation value determiner 250 may determine the second compensation value CV2 as the third compensation value CV3. When the sum of the product of the maximum value MC1 of the first compensation value CV1 and the first factor and the product of the maximum value MC2 of the second compensation value CV2 and the second factor is smaller than the maximum output voltage MV of the power supply, the third compensation value determiner 250 may determine, as the third compensation value CV3, a sum of a product of the first compensation value CV1 and the first factor and a product of the second compensation value CV2 and the second factor. The first factor and the second factor may be experimentally determined according to a characteristic of the display panel, a luminance characteristic, or the like.

In another embodiment, when the sum of the maximum value MC1 of the first compensation value CV1 and the maximum value MC2 of the second compensation value CV2 is greater than or equal to the maximum output voltage MV of the power supply, the third compensation value determiner 250 may determine the second compensation value CV2 as the third compensation value CV3. When the sum of the maximum value MC1 of the first compensation value CV1 and the maximum value MC2 of the second compensation value CV2 is smaller than the maximum output voltage MV of the power supply, the third compensation value determiner 250 may determine, as the third compensation value CV3, a sum of a product of the first compensation value CV1 and a first factor and a product of the second compensation value CV2 and a second factor. The first factor and the second factor may be experimentally determined according to a characteristic of the display panel, a luminance characteristic, or the like.

The driving controller 200-1 may set the third compensation value CV3 to the bias voltage VBIAS. Since the bias voltage VBIAS is generated based on power supplied from the power supply, the bias voltage VBIAS cannot exceed the maximum output voltage MV of the power supply. Therefore, the driving controller 200-1 may set the third compensation value CV3 not to exceed the maximum output voltage MV of the power supply.

The on-duty determiner 210 may receive the comparison result CR. The on-duty determiner 210 may determine whether the on-duty period OD is changed based on the comparison result CR. When the on-duty period OD is not changed, the on-duty determiner 210 may provide an off signal OS to the first compensation value determiner 220, the comparator 240, and the third compensation value determiner 250. The first compensation value determiner 220, the comparator 240, and the third compensation value determiner 250 may suspend their operations when the off signal OS is received thereto.

In an embodiment, when the sum of the maximum value MC1 of the first compensation value CV1 and the maximum value MC2 of the second compensation value CV2 is greater than or equal to the maximum output voltage MV of the power supply and when the difference between the driving frequency of the previous frame and a driving frequency of the current frame is higher than a reference frequency RF, the on-duty determiner 210 may not change the on-duty period OD. When the sum of the maximum value MC1 of the first compensation value CV1 and the maximum value MC2 of the second compensation value CV2 is smaller than the maximum output voltage MV of the power supply and when the difference between the driving frequency of the previous frame and a driving frequency of the current frame is higher than the reference frequency RF, the on-duty determiner 210 may change the on-duty period OD. In an embodiment, as shown in FIG. 11, when the reference frequency RF is 120 Hz, the driving frequency of the previous frame is 240 Hz, and the driving frequency of the current frame is 30 Hz, the off-duty period may be constant as 15H, for example.

In another embodiment, when the sum of the maximum value MC1 of the first compensation value CV1 and the maximum value MC2 of the second compensation value CV2 is greater than or equal to the maximum output voltage MV of the power supply and when a difference between the representative frequency PFC and the driving frequency of the current frame is higher than the reference frequency RF, the on-duty determiner 210 may not change the on-duty period OD. When the sum of the maximum value MC1 of the first compensation value CV1 and the maximum value MC2 of the second compensation value CV2 is smaller than the maximum output voltage MV of the power supply and when the difference between the representative frequency PFC and the driving frequency of the current frame is higher than the reference frequency RF, the on-duty determiner 210 may change the on-duty period OD.

In an embodiment, the on-duty determiner 210 does not change the on-duty period OD in a first frame in which the difference between the representative frequency PFC and the driving frequency of the current frame is higher than the reference frequency RF, but may change the on-duty period OD regardless of the difference between the representative frequency PFC and the driving frequency of the current frame in a subsequent frame. Also, the on-duty determiner 210 may not change the on-duty period in a first frame in which the difference between the representative frequency PFC and the driving frequency of the current frame is again higher than the reference frequency RF after the difference between the representative frequency PFC and the driving frequency of the current frame is smaller than or equal to the reference frequency RF. However, the disclosure is not limited to a process until the on-duty determiner 210 does not again change the on-duty period OD.

As described above, when the driving frequency is lowered from the relatively high frequency to the relatively low frequency, the luminance may be influenced by not only the hysteresis characteristic but also the on-duty period OD. When the third compensation value CV3 does not have any sufficiently relatively large value due to the maximum output voltage MV of the power supply, an excessive luminance increase may occur. Thus, the driving controller 200-1 does not increase the on-duty period OD in a period on which the driving frequency is changed, so that the excessive luminance increase may be compensated.

Figures 12, 13:
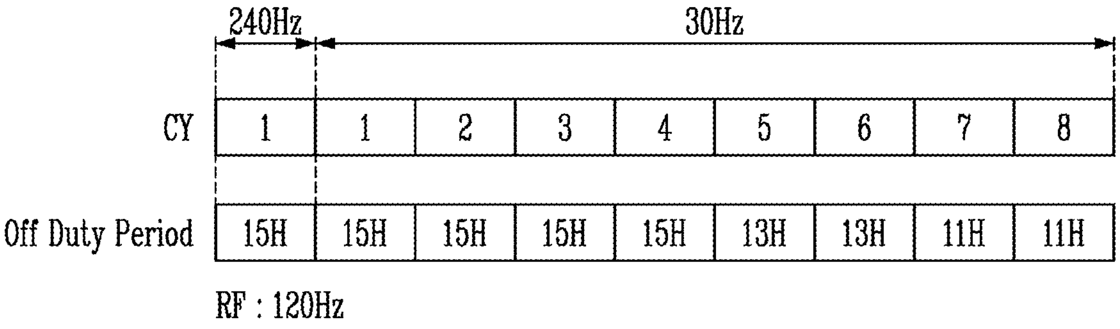
FIGS. 12 and 13 are diagrams illustrating an embodiment of an operation of the display device shown in FIG. 1 when the sum of the maximum value of the first compensation value and the maximum value of the second compensation value is smaller than the maximum output voltage of the power supply.

FIGS. 12 and 13 are diagrams illustrating an embodiment of an operation of the display device shown in FIG. 1 when the sum of the maximum value MC1 of the first compensation value CV1 and the maximum value MC2 of the second compensation value CV2 is smaller than the maximum output voltage MV of the power supply.

In FIG. 12, a unit of the variation DC of the on-duty period is represented as horizontal time H, a unit of the first compensation value CV1 is represented as voltage V, and a unit of a representative frequency PFC is represented as hertz (Hz).

Referring to FIGS. 2, 3, 7, 9, 12, and 13, in an embodiment, when the sum of the maximum value MC1 of the first compensation value CV1 and the maximum value MC2 of the second compensation value CV2 is smaller than the maximum output voltage MV of the power supply, the third compensation value determiner 250 may determine, as the third compensation value CV3, the sum of the first compensation value CV1 and the second compensation value CV2. In an embodiment, as shown in FIGS. 4, 7, and 12, the third compensation value CV3 may be equal to the sum of the first compensation value CV1 and the second compensation value CV2, for example.

In another embodiment, when the sum of the product of the maximum value MC1 of the first compensation value CV1 and the first factor and the product of the maximum value MC2 of the second compensation value CV2 and the second factor is smaller than the maximum output voltage MV of the power supply, the third compensation value determiner 250 may determine, as the third compensation value CV3, a sum of a product of the first compensation value CV1 and a first factor and a product of the second compensation value CV2 and a second factor. The first factor and the second factor may be experimentally determined according to a characteristic of the display panel, a luminance characteristic, or the like.

In another embodiment, when the sum of the maximum value MC1 of the first compensation value CV1 and the maximum value MC2 of the second compensation value CV2 is smaller than the maximum output voltage MV of the power supply, the third compensation value determiner 250 may determine, as the third compensation value CV3, a sum of a product of the first compensation value CV1 and a first factor and a product of the second compensation value CV2 and a second factor. The first factor and the second factor may be experimentally determined according to a characteristic of the display panel, a luminance characteristic, or the like.

In an embodiment, when the sum of the product of the maximum value MC1 of the first compensation value CV1 and the first factor and the product of the maximum value MC2 of the second compensation value CV2 and the second factor is greater than or equal to the maximum output voltage MV of the power supply and when the difference between the driving frequency of the previous frame and a driving frequency of the current frame is higher than the reference frequency RF, the on-duty determiner 210 may not change the on-duty period OD. When the sum of the product of the maximum value MC1 of the first compensation value CV1 and the first factor and the product of the maximum value MC2 of the second compensation value CV2 and the second factor is smaller than the maximum output voltage MV of the power supply and when the difference between the driving frequency of the previous frame and a driving frequency of the current frame is higher than the reference frequency RF, the on-duty determiner 210 may change the on-duty period OD. In an embodiment, as shown in FIGS. 4 and 13, when the reference frequency RF is 120 Hz, the driving frequency of the previous frame is 240 Hz, and the driving frequency of the current frame is 30 Hz, the off-duty period may be determined based on the first lookup table LUT1, for example.

In another embodiment, when the sum of the product of the maximum value MC1 of the first compensation value CV1 and the first factor and the product of the maximum value MC2 of the second compensation value CV2 and the second factor is greater than or equal to the maximum output voltage MV of the power supply and when the difference between the representative frequency PFC and the driving frequency of the current frame is higher than the reference frequency RF, the on-duty determiner 210 may not change the on-duty period OD. When the sum of the product of the maximum value MC1 of the first compensation value CV1 and the first factor and the product of the maximum value MC2 of the second compensation value CV2 and the second factor is smaller than the maximum output voltage MV of the power supply and when the difference between the representative frequency PFC and the driving frequency of the current frame is higher than the reference frequency RF, the on-duty determiner 210 may change the on-duty period OD.

Figure 14:
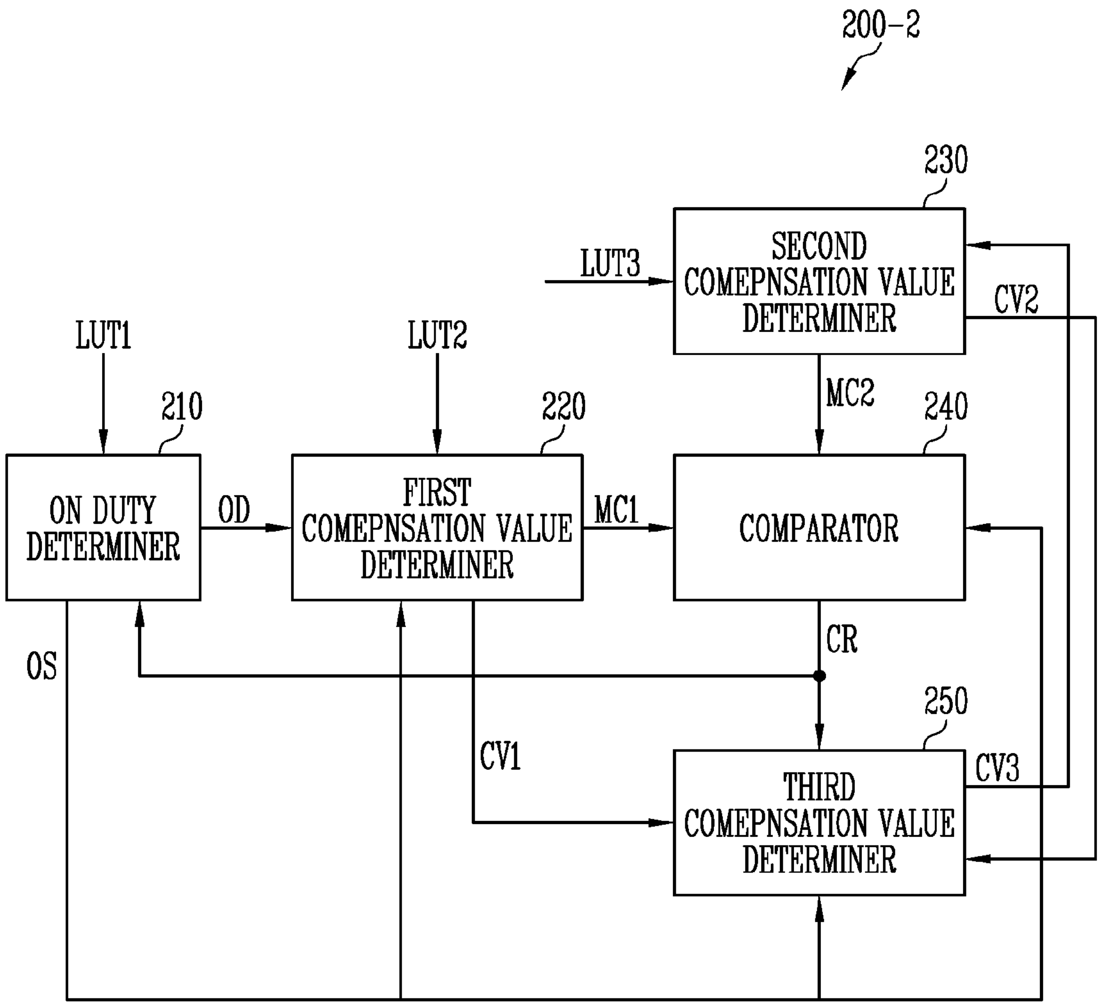
FIG. 14 is a block diagram illustrating an embodiment of a driving controller of a display device in accordance with the disclosure.

FIG. 14 is a block diagram illustrating an embodiment of a driving controller 200-2 of a display device in accordance with the disclosure.

The display device in accordance with these embodiments is configured identically to the display device shown in FIG. 1, except that the third lookup table LUT3 is updated. Therefore, components identical or similar to those described above are designated by like reference numerals, and overlapping descriptions will be omitted.

Referring to FIGS. 3 and 14, the second compensation value determiner 230 may determine a second compensation value CV2 by the third lookup table LUT3. The second compensation value CV2 included in the third lookup table LUT3 may be updated to the third compensation value CV3. In addition, the bias voltage VBIAS may be set to the updated second compensation value CV2.

Figure 15:
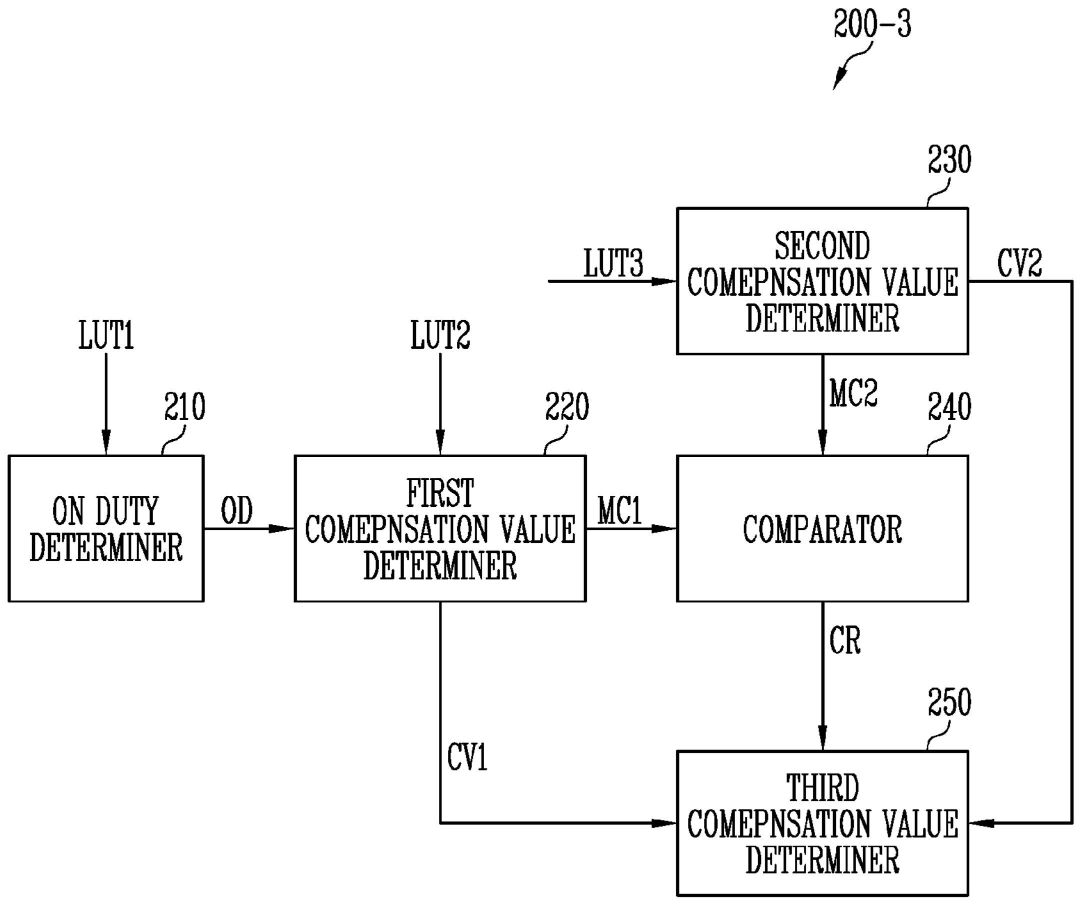
FIG. 15 is a block diagram illustrating an embodiment of a driving controller of a display device in accordance with the disclosure.

FIG. 15 is a block diagram illustrating an embodiment of a driving controller 200-3 of a display device in accordance with the disclosure. FIG. 16 is a diagram illustrating an embodiment of an operation of the display device shown in FIG. 15 when the sum of the maximum value MC1 of the first compensation value CV1 and the maximum value MC2 of the second compensation value CV2 is greater than or equal to the maximum output voltage MV of the power supply.

In FIG. 16, a unit of the variation DC of the on-duty period is represented as horizontal time H, a unit of the first compensation value CV1 is represented as voltage V, and a unit of a representative frequency PFC is represented as hertz (Hz).

The display device in accordance with these embodiments is configured identically to the display device shown in FIG. 1, except an operation when the sum of the maximum value MC1 of the first compensation value CV1 and the maximum value MC2 of the second compensation value CV2 is greater than or equal to the maximum output voltage MV of the power supply. Therefore, components identical or similar to those described above are designated by like reference numerals, and overlapping descriptions will be omitted.

Referring to FIGS. 3, 15, and 16, when the sum of the maximum value MC1 of the first compensation value CV1 and the maximum value MC2 of the second compensation value CV2 is greater than or equal to the maximum output voltage MV of the power supply, the third compensation value determiner 250 may determine, as the third compensation value CV3, a sum of a product of the first compensation value CV1 and a first factor and a product of the second compensation value CV2 and a second factor. A sum of a product of the maximum value MC1 of the first compensation value CV1 and the first factor and a product of the maximum value MC2 of the second compensation value CV2 and the second factor may be smaller than the maximum output voltage MV of the power supply.

In an embodiment, for convenience of description, it is assumed that the maximum value MC1 of the first compensation value CV1 is 0.60V, the maximum value MC2 of the second compensation value CV2 is 6.85V, and the maximum output voltage MV of the power supply is 7.20V, for example. The sum of the maximum value MC1 of the first compensation value CV1 and the maximum value MC2 of the second compensation value CV2 is greater than the maximum output voltage MV of the power supply. The driving controller 200-3 may determine the first factor as 0.5 and determine the second factor as 1 by considering the maximum output voltage MV of the power supply. Therefore, the sum of the product of the maximum value MC1 of the first compensation value CV1 and the first factor and the product of the maximum value MC2 of the second compensation value CV2 and the second factor may be 7.15V which is smaller than the maximum output voltage MV of the power supply.

As described above, the driving controller 200-3 may increase the bias voltage VBIAS within a range in which the bias voltage VBIAS does not exceed the maximum output voltage MV of the power supply so as to compensate for an excessive luminance increase in a period in which the driving frequency is changed.

In an embodiment, the driving controller 200-3 may control the second initialization voltage VAINT instead of the bias voltage VBIAS. In an embodiment, the driving controller 200-3 may determine first to third compensation values of the second initialization voltage VAINT, and set the second initialization voltage VAINT to the third compensation value, for example. The driving controller 200-3 may decrease the second initialization voltage VAINT within a range in which the second initialization voltage VAINT does not become lower than a minimum output voltage of the power supply.

Figure 17:
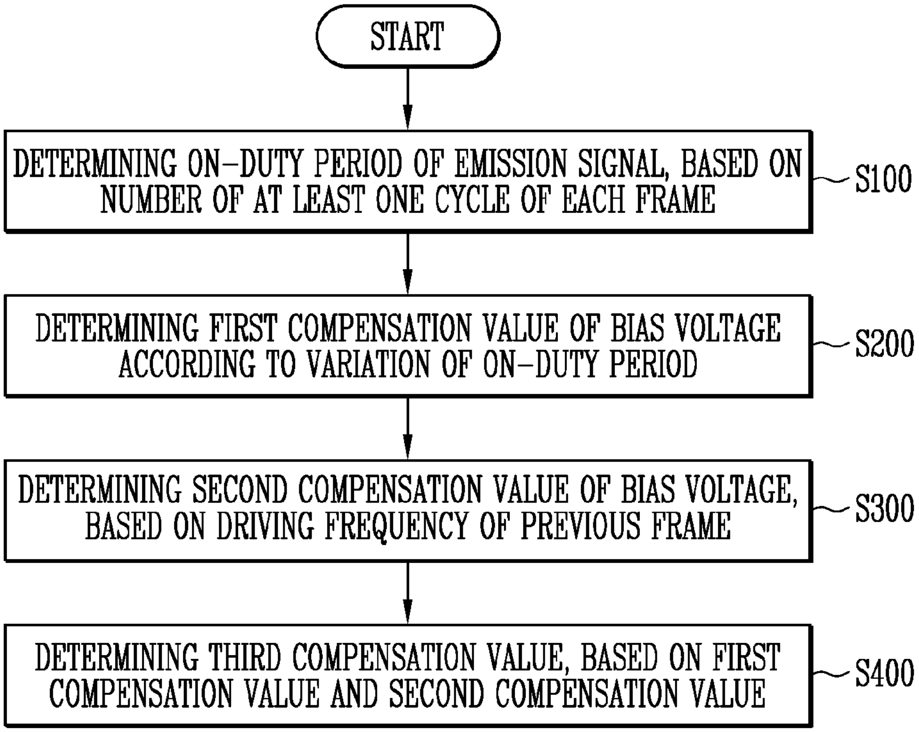
FIG. 17 is a flowchart illustrating an embodiment of a method of driving a display device in accordance with the disclosure.

FIG. 17 is a flowchart illustrating an embodiment of a method of driving a display device in accordance with the disclosure.

Referring to FIG. 17, in the method of driving the display device, which is shown in FIG. 17, an on-duty period of an emission signal may be determined based on a number of at least one cycle of each frame (S100), a first compensation value of a bias voltage according to a variation of the on-duty period may be determined (S200), a second compensation value of the bias voltage may be determined based on a driving frequency of a previous frame (S300), and a third compensation value may be determined based on the first compensation value and the second compensation value (S400).

In the method of driving the display device, which is shown in FIG. 17, a sum of a maximum value of the first compensation value and a maximum value of the second compensation value may be compared with a maximum output voltage of the power supply. In addition, the third compensation value may be determined based on a result obtained by comparing the sum of the maximum value of the first compensation value and the maximum value of the second compensation value with the maximum output voltage of the power supply.

In an embodiment, when the sum of the maximum value of the first compensation value and the maximum value of the second compensation value is greater than or equal to the maximum output voltage of the power supply, the third compensation value may be determined as the second compensation value. When the sum of the maximum value of the first compensation value and the maximum value of the second compensation value is smaller than the maximum output voltage of the power supply, the third compensation value may be determined as a sum of the first compensation value and the second compensation value.

Figure 18:
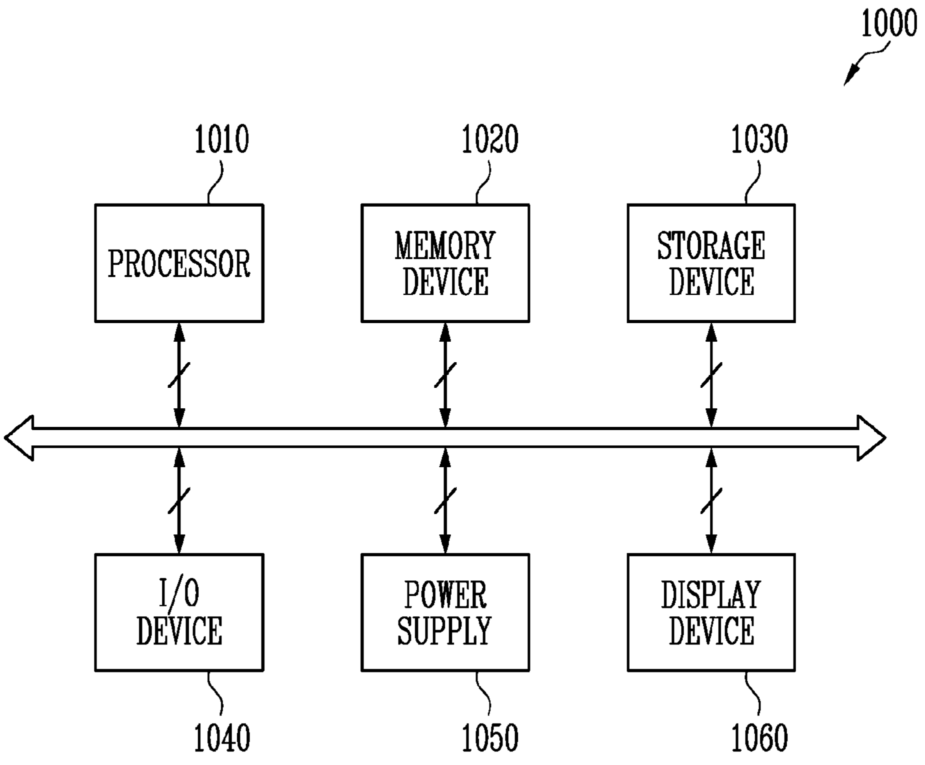
FIG. 18 is a block diagram illustrating an embodiment of an electronic device in accordance with the disclosure.

FIG. 18 is a block diagram illustrating an embodiment of an electronic device 1000 in accordance with the disclosure.

Referring to FIG. 18, the electronic device 1000 may include a processor 1010, a memory device 1020, a storage device 1030, an input/output ("I/O") device 1040, a power supply 1050, and a display device 1060. The electronic device 1000 may be the display device shown in FIG. 1. Also, the electronic device 1000 may further include ports capable of communicating with a video card, a sound card, a memory card, a universal serial bus ("USB") device, or the like, or communicating with other systems. The electronic device 1000 may be implemented as a mobile phone, a video phone, a smart pad, a smart watch, a tablet personal computer ("PC"), a vehicle navigation system, a computer monitor, a notebook computer, a head disposed (e.g., mounted) display device, or the like.

The processor 1010 may perform predetermined calculations or tasks. In some embodiments, the processor 1010 may be a microprocessor, a central processing unit, an application processor, or the like. The processor 1010 may be connected to other components through an address bus, a control bus, a data bus, or the like. In some embodiments, the processor 1010 may be connected to an extension bus such as a peripheral component interconnect ("PCI") bus.

The memory device 1020 may store data desired for an operation of the electronic device 1000. In an embodiment, the memory device 1020 may include a nonvolatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PORAM") device, a magnetic random access memory ("MRAM") device, or a ferroelectric random access memory ("FRAM") device, and/or a volatile memory device such as a dynamic random access memory ("DRAM") device, a static random access memory ("SRAM") device, or a mobile DRAM device, for example.

The storage device 1030 may include a solid state drive ("SSD"), a hard disk drive ("HDD"), a compact disc read-only memory ("CD-ROM"), or the like.

The I/O device 1040 may include an input means such as a keyboard, a keypad, a touch screen, or a mouse, and an output means such as a speaker or a printer. In some embodiments, the display device 1060 may be included in the I/O device 1040.

The power supply 1050 may supply power desired for an operation of the electronic device 1000. In an embodiment, the power supply 1050 may be a power management integrated circuit ("PMIC"), for example.

The display device 1060 may display an image corresponding to visual information of the electronic device 1000. The display device 1060 may be an organic light-emitting display device or a quantum dot light-emitting display device, but the disclosure is not limited thereto. The display device 1060 may be connected to other components through the buses or another communication link.

The disclosure may be applied to display devices and electronic devices including the same. In an embodiment, the disclosure may be applied to digital televisions ("TVs"), three dimensional ("3D") TVs, mobile phones, smart phones, tablet computers, virtual reality ("VR") devices, PCs, home appliances, notebook computers, personal digital assistants ("PDAs"), portable media players ("PMPs"), digital cameras, music players, portable game consoles, navigation systems, or the like.

In accordance with the disclosure, the driver controller controls an on-duty period of an emission signal, based on a number of at least one cycle of a current frame, so that a luminance decrease at a relatively low frequency due to a leakage characteristic may be compensated.

In accordance with the disclosure, the driver controller compensates for a bias voltage, based on a driving frequency of a previous frame, so that a luminance increase according to a change in driving frequency due to a hysteresis characteristic may be compensated.

In accordance with the disclosure, the driver controller sets the bias voltage to a third compensation value, so that an excessive luminance increase due to an increase in the on-duty period when the driving frequency is lowered from a relatively high frequency to a relatively low frequency may be compensated.

Embodiments have been disclosed herein, and although predetermined terms are employed, they are used and are to be interpreted in a generic and descriptive sense only and not for purpose of limitation. In some instances, as would be apparent to one of ordinary skill in the art as of the filing of the application, features, characteristics, and/or elements described in connection with a particular embodiment may be used singly or in any combinations with features, characteristics, and/or elements described in connection with other embodiments unless otherwise specifically indicated. Accordingly, it will be understood by those of skill in the art that various changes in form and details may be made without departing from the spirit and scope of the disclosure as set forth in the following claims.

What is claimed is:

1. A method of driving a display device, the method comprising:

determining an on-duty period of an emission signal, based on a number of at least one cycle of each frame;

determining a first compensation value of a bias voltage according to a variation of the on-duty period;

determining a second compensation value of the bias voltage, based on a driving frequency of a previous frame; and determining a third compensation value, based on the first compensation value and the second compensation value.

2. The method of claim 1, further comprising comparing a sum of a maximum value of the first compensation value and a maximum value of the second compensation value with a maximum output voltage of a power supply, and outputting a comparison result, wherein the determining of the third compensation value includes determining the third compensation value, based on the comparison result.

3. The method of claim 2, wherein, the determining of the third compensation value includes determining the second compensation value as the third compensation value, when the sum of the maximum value of the first compensation value and the maximum value of the second compensation value is greater than or equal to the maximum output voltage of the power supply.

4. The method of claim 2, wherein the determining of the on-duty period of an emission signal includes:

maintaining the on-duty period when the sum of the maximum value of the first compensation value and the maximum value of the second compensation value is greater than or equal to the maximum output voltage of the power supply and when a difference between the driving frequency of the previous frame and a driving frequency of the current frame is higher than a reference frequency; and changing the on-duty period when the sum of the maximum value of the first compensation value and the maximum value of the second compensation value is smaller than the maximum output voltage of the power supply and when the difference between the driving frequency of the previous frame and the driving frequency of the current frame is higher than the reference frequency.

5. The method of claim 2, wherein the determining of the third compensation value includes determining, as the third compensation value, a sum of a product of the first compensation value and a first factor and a product of the second compensation value and a second factor, when the sum of the maximum value of the first compensation value and the maximum value of the second compensation value is greater than or equal to the maximum output voltage of the power supply, and wherein a sum of a product of the maximum value of the first compensation value and the first factor and a product of the maximum value of the second compensation value and the second factor is smaller than the maximum output voltage of the power supply.

6. The method of claim 2, wherein the determining of the third compensation value includes determining, as the third compensation value, a sum of the first compensation value and the second compensation value, when the sum of the maximum value of the first compensation value and the maximum value of the second compensation value is smaller than the maximum output voltage of the power supply.

7. The method of claim 2, wherein the determining of the third compensation value includes determining, as the third compensation value, a sum of a product of the first compensation value and a first factor and a product of the second compensation value and a second factor, when the sum of the maximum value of the first compensation value and the maximum value of the second compensation value is smaller than the maximum output voltage of the power supply.

8. The method of claim 1, wherein the on-duty period becomes larger as the number of the at least one cycle becomes larger.

9. The method of claim 1, wherein the determining an on-duty period of an emission signal includes determining the on-duty period by a first lookup table including the variation of the on-duty period according to the number of the at least one cycle.

10. The method of claim 1, wherein the first compensation value becomes larger as the variation of the on-duty period becomes larger.

11. The method of claim 1, wherein the determining of the first compensation value of a bias voltage includes determining the first compensation value by a second lookup table including the first compensation value according to the variation of the on-duty period.

12. The method of claim 1, wherein the second compensation value becomes larger as the driving frequency of the previous frame becomes higher.

13. The method of claim 1, wherein the second compensation value becomes larger as a difference between the driving frequency of the previous frame and a driving frequency of the current frame becomes larger.

14. The method of claim 1, wherein the determining of the second compensation value of the bias voltage includes determining the second compensation value by a third lookup table including the second compensation value according to the driving frequency of the previous frame and the number of the at least one cycle.

15. The method of claim 1, wherein the bias voltage is determined as the third compensation value.

16. The method of claim 1, wherein the determining of the second compensation value of the bias voltage includes determining the second compensation value by a third lookup table including the second compensation value according to the driving frequency of the previous frame and the number of the at least one cycle, and wherein the second compensation value included in the third lookup table is updated to the third compensation value.

17. A electronic device comprising:

a display panel including sub-pixels;

a data driver which provides data voltages to the sub-pixels;

a gate driver which provides gate signals to the sub-pixels;

an emission driver which provides emission signals to the sub-pixels; and a driving controller which controls the data driver and the gate driver, wherein the driving controller determines an on-duty period of an emission signal of the emission signals, based on a number of at least one cycle of a current frame, determines a first compensation value of a bias voltage according to a variation of the on-duty period, determines a second compensation value of the bias voltage, based on a driving frequency of a previous frame, and determines a third compensation value, based on the first compensation value and the second compensation value.

* * * * *